United States Patent
Chen et al.

(10) Patent No.: US 11,824,386 B2
(45) Date of Patent: Nov. 21, 2023

(54) MAGNETIC WIRELESS CHARGING HOLDER

(71) Applicants: Wen Chen, Guangzhou (CN); Feng Yu, Guangzhou (CN)

(72) Inventors: Wen Chen, Guangzhou (CN); Feng Yu, Guangzhou (CN)

( * ) Notice: Subject to any disclaimer, the term of this patent is extended or adjusted under 35 U.S.C. 154(b) by 199 days.

(21) Appl. No.: 17/396,769

(22) Filed: Aug. 9, 2021

(65) Prior Publication Data
US 2022/0224133 A1    Jul. 14, 2022

(30) Foreign Application Priority Data
Jan. 13, 2021  (CN) .......................... 202120084613.3

(51) Int. Cl.
| H01M 10/46 | (2006.01) |
| H02J 7/00 | (2006.01) |
| H02J 50/10 | (2016.01) |
| H02J 50/70 | (2016.01) |
| H02J 7/02 | (2016.01) |

(52) U.S. Cl.
CPC .............. *H02J 7/0044* (2013.01); *H02J 7/02* (2013.01); *H02J 50/10* (2016.02); *H02J 50/70* (2016.02)

(58) Field of Classification Search
CPC .......... H02J 7/0044; H02J 7/0042; H02J 7/02; H02J 50/10; H02J 50/70; H02J 50/005
USPC ................................ 320/107, 108, 114, 115
See application file for complete search history.

(56) References Cited

U.S. PATENT DOCUMENTS

2016/0259374 A1* 9/2016 Breiwa ..................... F16B 1/00

FOREIGN PATENT DOCUMENTS

KR    20190021546 A  *  3/2019 ............... H02J 7/02

* cited by examiner

*Primary Examiner* — Edward Tso
(74) *Attorney, Agent, or Firm* — Leong C. Lei

(57) ABSTRACT

A magnetic wireless charging holder includes a holder body and a main body. The main body is disposed on the holder body. The main body includes a housing, a wireless charging module, and a first magnet configured to attract a built-in magnet of a mobile phone. A magnetic shield is fixed in the housing for attracting and positioning the first magnet. With the first magnet, the product has a magnetic attraction function. The first magnet and the built-in magnet of the mobile phone are mutually attracted each other to achieve a rapid and accurate alignment.

9 Claims, 8 Drawing Sheets

MAGNETIC WIRELESS CHARGING HOLDER

BACKGROUND OF THE INVENTION

1. Field of the Invention

The present invention relates to a charging holder, and more particularly to a magnetic wireless charging holder.

2. Description of the Prior Art

A wireless charger is a device that uses the principle of electromagnetic induction for charging. Its principle is similar to that of a transformer. By providing a receiver coil and a transmitter coil, the transmitter coil transmits an electromagnetic signal to the outside under the action of electric power, and the receiver coil receives the electromagnetic signal and converts the electromagnetic signal into electric current, thereby achieving wireless charging. Wireless charging technology is a special way of power supply. It does not require a power cord, relies on electromagnetic wave transmission, and then converts electromagnetic wave energy into electrical energy for wireless charging.

A conventional wireless charger generally does not have a magnetic attraction function, and in particular, it cannot be quickly, accurately aligned with a mobile phone with a built-in magnet. This will affect the efficiency of wireless charging. Therefore, it is necessary to improve the conventional wireless charger.

SUMMARY OF THE INVENTION

In view of the defects of the prior art, the primary object of the present invention is to provide a magnetic wireless charging holder, which can effectively solve the problem that the existing wireless charger does not have the magnetic attraction function, especially the problem that the existing wireless charger cannot be quickly, accurately aligned with the built-in magnet of a mobile phone.

A magnetic wireless charging holder comprises a holder body and a main body. The main body is disposed on the holder body. The main body includes a housing, a wireless charging module, and a first magnet configured to attract a built-in magnet of a mobile phone. A front of the housing has a placement seat. A magnetic shield is fixed in the housing. The wireless charging module and the first magnet are disposed in the housing and located in front of the magnetic shield. The wireless charging module is in proximity to the placement seat. The main body is detachably mounted on the holder body and positioned through magnetic attraction. A front end of the holder body has a spherical head. A back of the housing has a recess. The spherical head is rotatably embedded in the recess. A second magnet is provided in the recess for attracting and positioning the holder body. The second magnet is located in back of the magnetic shield. The second magnet and the magnetic shield are mutually attracted each other. The spherical head is attracted and positioned by the second magnet.

A magnetic wireless charging holder comprises a holder body and a main body. The main body is disposed on the holder body. The main body includes a housing, a wireless charging module, and a first magnet configured to attract a built-in magnet of a mobile phone. A front of the housing has a placement seat. The wireless charging module and the first magnet are disposed in the housing. The wireless charging module is in proximity to the placement seat. The wireless charging module includes a substrate having a magnetic shield effect and a transmitter coil arranged on the substrate. The main body is detachably mounted on the holder body and positioned through magnetic attraction. A front end of the holder body has a spherical head. A back of the housing has a recess. The spherical head is rotatably embedded in the recess. A second magnet is provided in the recess for attracting and positioning the holder body. The second magnet is located in back of the substrate. The second magnet and the substrate are mutually attracted each other. The spherical head is attracted and positioned by the second magnet.

Compared with the prior art, the present invention has obvious advantages and beneficial effects. Specifically, it can be known from the above technical solutions:

With the first magnet, the product has a magnetic attraction function. The first magnet and the built-in magnet of the mobile phone are mutually attracted each other to achieve a rapid and accurate alignment, so that the wireless charging module and the receiver coil inside the mobile phone can be quickly, automatically aligned. Thereby, the efficiency of wireless charging can be effectively improved, without manual alignment. It brings convenience to use. Besides, a magnetic shield or a substrate having a magnetic shield effect is provided. On the one hand, the magnetic shield or substrate is used to attract and position the first magnet instead of glue or other means to facilitate the product assembly. On the other hand, the magnetic shield or substrate can shield the strong magnet on the back, so that the operation of the wireless charging module is more stable and reliable.

DETAILED DESCRIPTION OF THE PREFERRED EMBODIMENTS

FIGS. 1 to 6 show the specific structure of a first embodiment of the present invention, comprising a holder body 10 and a main body 20.

Figure 1:
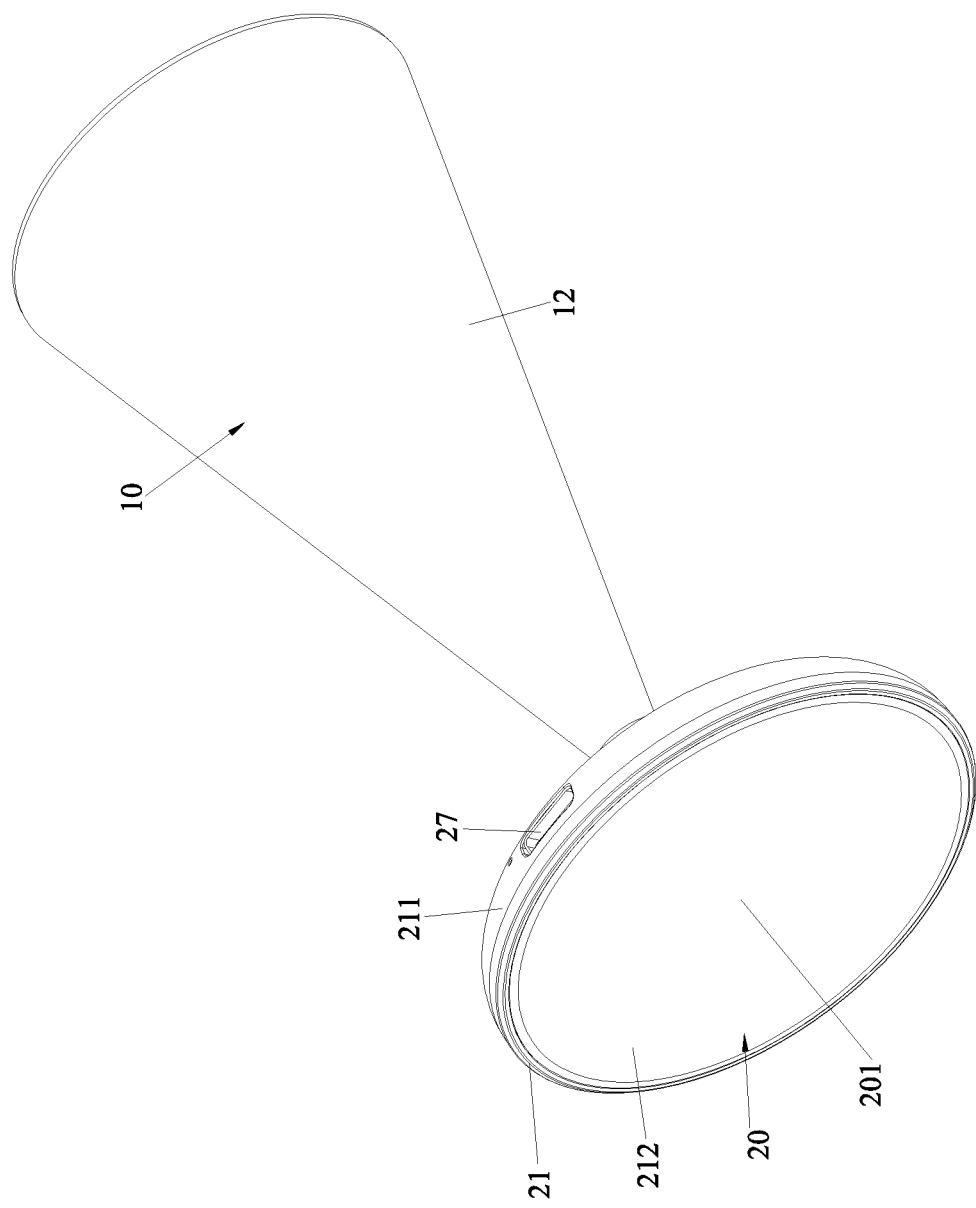
FIG. 1 is a perspective view according to a first embodiment of the present invention.
Figure 2:
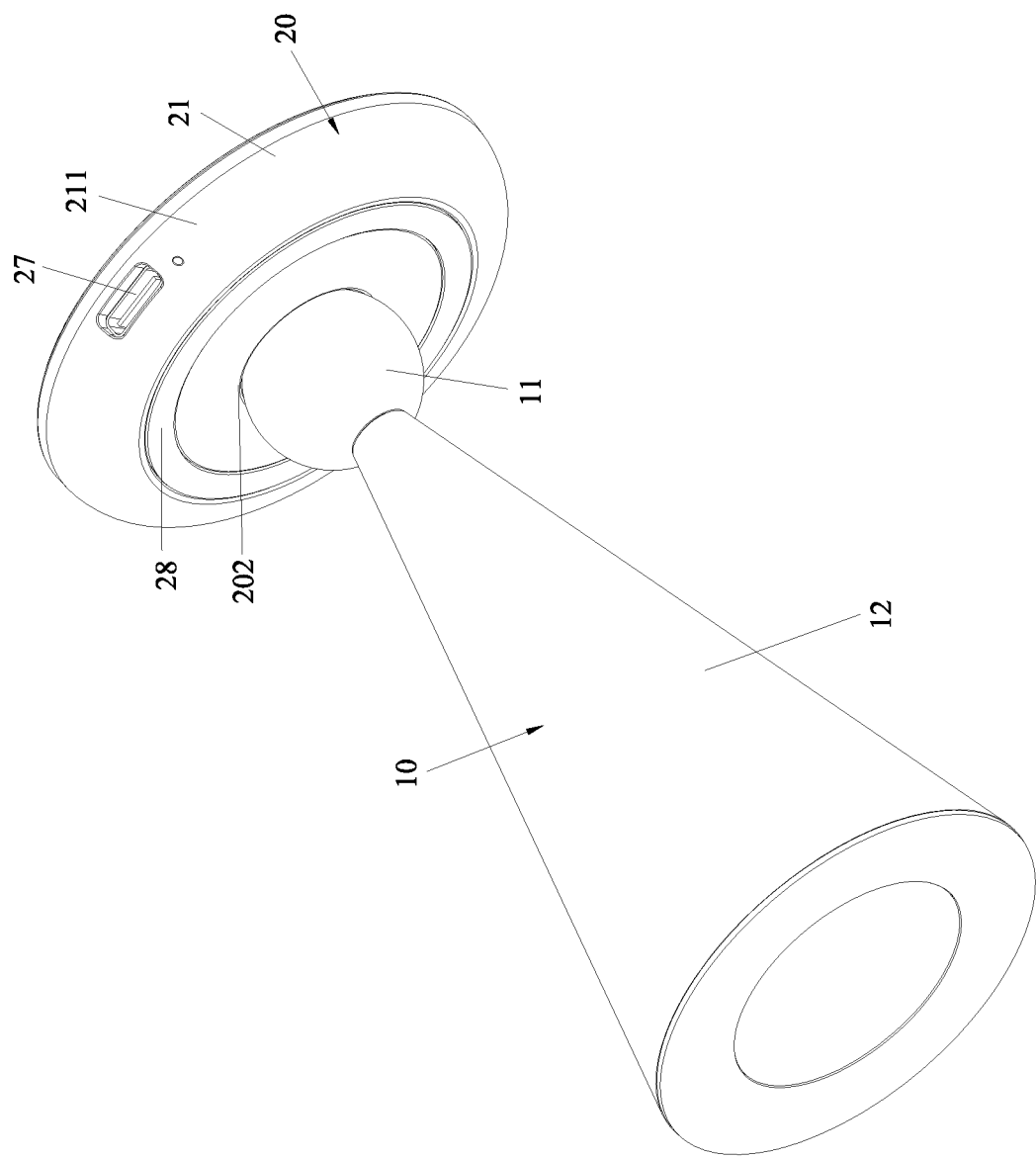
FIG. 2 is another perspective view according to the first embodiment of the present invention.
Figure 3:
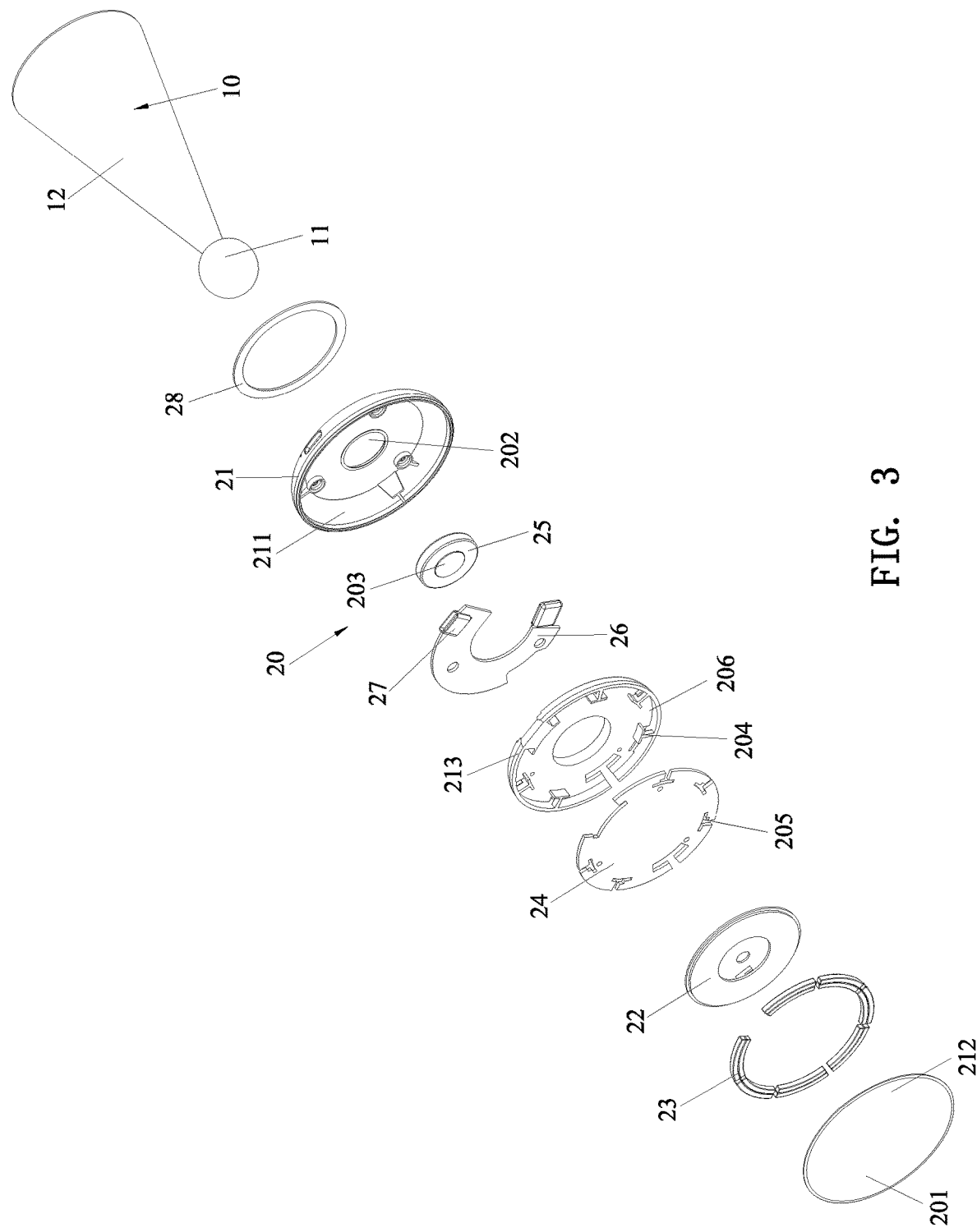
FIG. 3 is an exploded view according to the first embodiment of the present invention.
Figure 4:
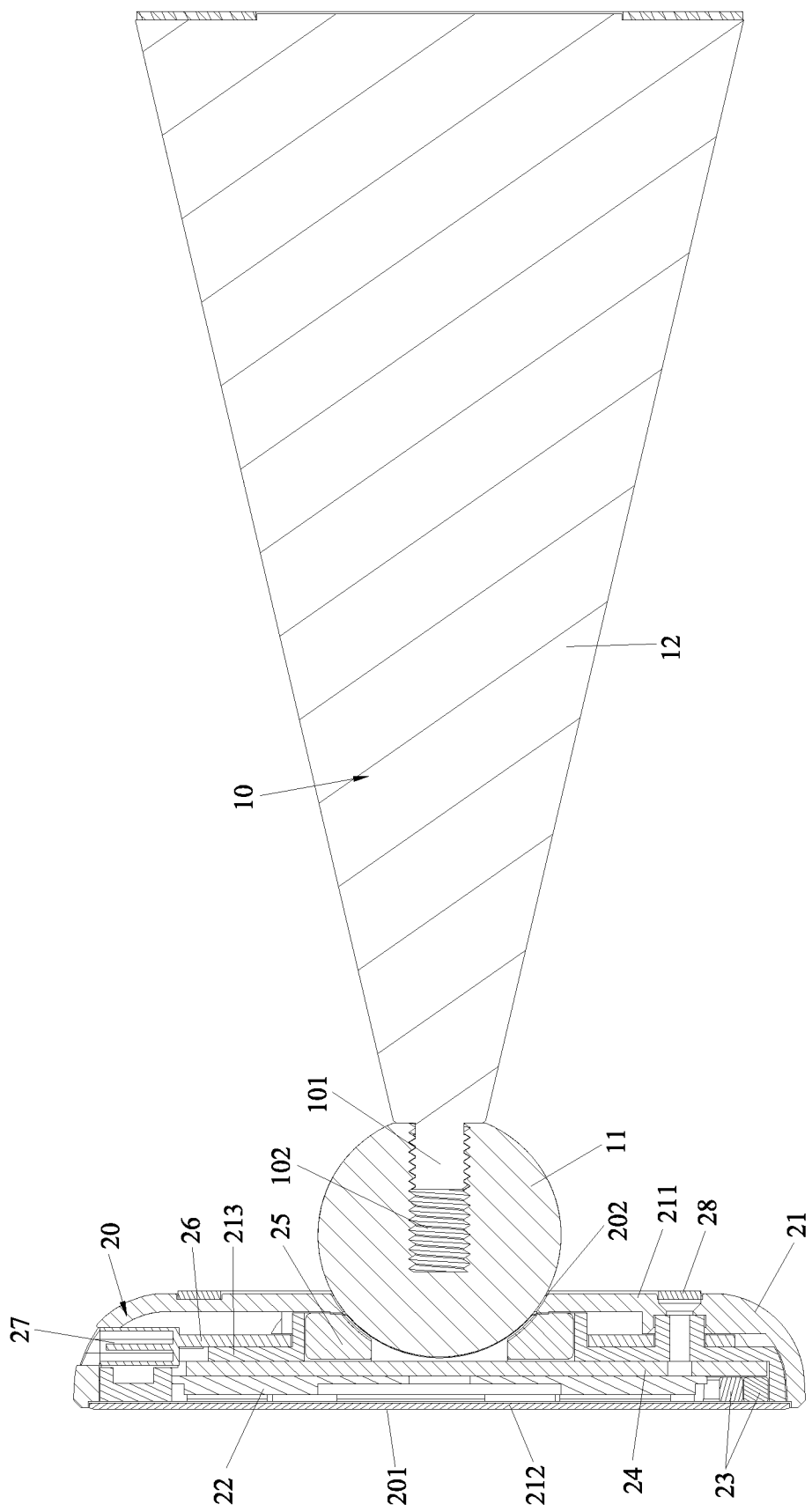
FIG. 4 is a cross-sectional view according to the first embodiment of the present invention.
Figure 5:
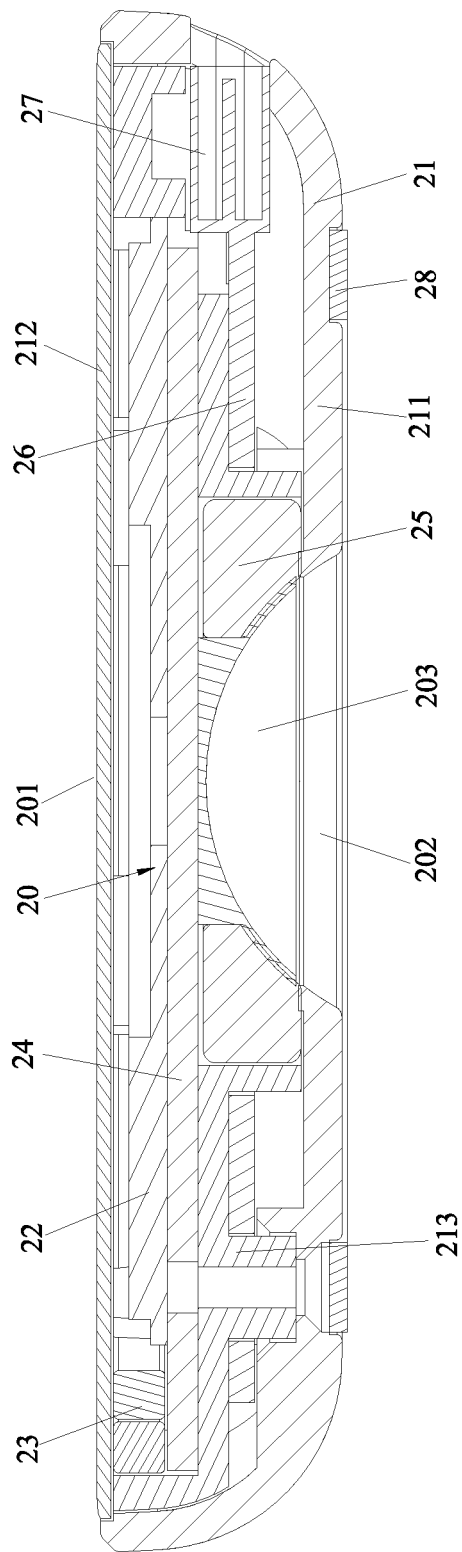
FIG. 5 is a cross-sectional view of the main body according to the first embodiment of the present invention.
Figure 6:
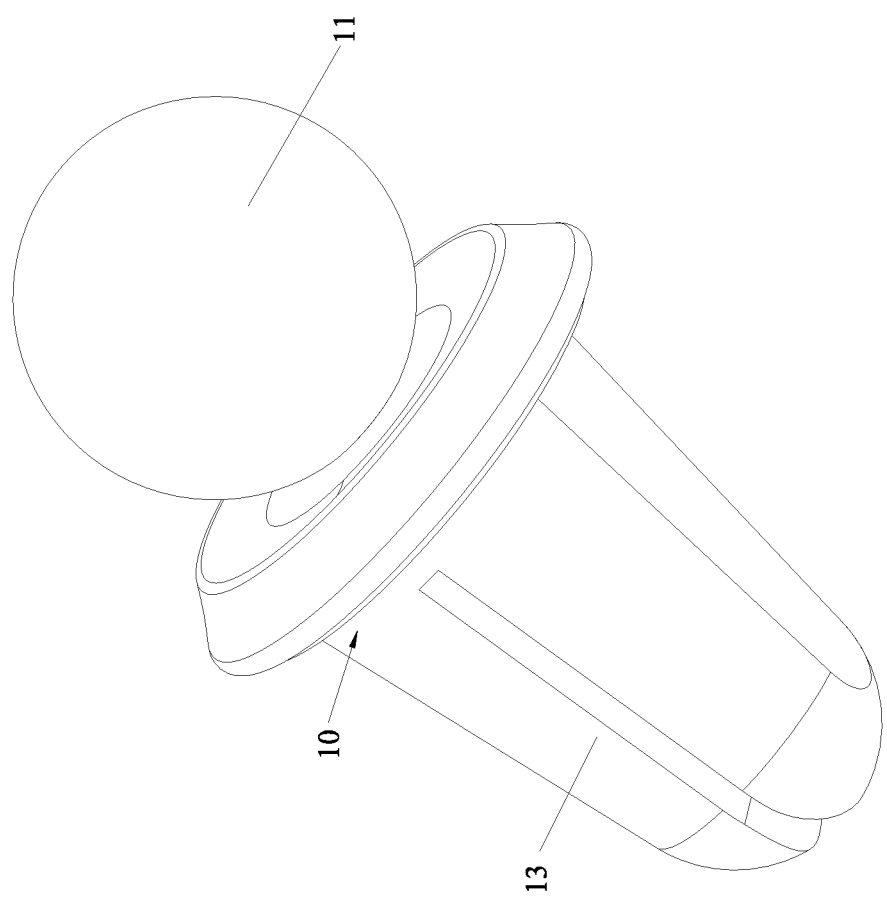
FIG. 6 is a perspective view of another example of the holder body according to the first embodiment of the present invention.

The front end of the holder body 10 has a spherical head 11. In this embodiment, the holder body 10 includes a body portion 12. The body portion 12 has a tapered shape or other shapes, but not limited thereto. The front end of the body portion 12 has a threaded post 101. The spherical head 11 is formed with a threaded hole 102. The threaded post 101 is threadedly connected to the threaded hole 102. As shown in FIG. 6, the holder body 10 may be another configuration, which includes a clamping portion 13. The clamping portion 13 is configured to clamp the air-conditioning vent of a car. The spherical head 11 is integrally extended from the front end of the champing portion 13. The holder body 10 may be other configurations, but no limited thereto.

The main body 20 is disposed on the holder body 10. The main body 20 includes a housing 21, a wireless charging module 22, and a first magnet 23 configured to attract a built-in magnet of a mobile phone. The front of the housing 21 has a placement seat 201. A magnetic shield 24 for stabilizing the efficiency of wireless charging is fixed in the housing 21. The magnetic shield 24 is configured to attract and position the first magnet 23. The wireless charging module 22 and the first magnet 23 are disposed in the housing 21 and located in front of the magnetic shield 24. The wireless charging module 22 is in proximity to the placement seat 201. The wireless charging module 22 is a wireless charging transmitter coil. In this embodiment, the main body 20 is detachably mounted on the holder body 10 and positioned through magnetic attraction, so that the main body 20 can be removed from the holder body 10 as needed. The housing 21 is disk-shaped. The back of the housing 21 has a recess 202. The spherical head 11 is rotatably embedded in the recess 202. A second magnet 25 is provided in the recess 202 for attracting and positioning the holder body 10. The second magnet 25 is located in back of the magnetic shield 24. The second magnet 25 and the magnetic shield 24 are mutually attracted each other. The spherical head 11 is attracted and positioned by the second magnet 25. The second magnet 25 is formed with a hole 203. The hole 203 is aligned with the recess 202. The spherical head 11 is partially embedded in the hole 203. The magnetic shield 24 is made of iron. It may be made of other metal materials that can be attracted by the magnet, but not limited thereto.

Specifically, the housing 21 includes a rear housing 211, a front panel 212, and an inner bracket 213. The front panel 212 is disposed in front of the rear housing 211. The inner bracket 213 is sandwiched between the rear housing 211 and the front panel 212. The placement seat 201 is located on the front panel 212. The wireless charging module 22 and the first magnet 23 are sandwiched between the inner bracket 213 and the front panel 212. The first magnet 23 is located on the periphery of the wireless charging module 22. The magnetic shield 24 is fixed on the front side of the inner bracket 213. The second magnet 25 has a ring shape. The second magnet 25 is located in the center of the housing 21 and sandwiched between the inner bracket 213 and the rear housing 211. A plurality of T-shaped engaging blocks 204 are provided on the periphery of the front side of the inner bracket 213. A plurality of T-shaped engaging grooves 205 are formed on the periphery of the magnetic shield 24. The plurality of T-shaped engaging blocks 204 are engaged in the corresponding T-shaped engaging grooves 205, respectively. The magnetic shield 24 is fixed to the inner bracket 213 by locking screws or an insert molding process. A plurality of arc-shaped grooves 206 are formed on the periphery of the front side of the inner bracket 213. The first magnet 23 is made of a plurality of portions and arc-shaped to be engaged in the corresponding arc-shaped grooves 206. The first magnet 23 and the magnetic shield 24 are mutually attracted to each other.

In addition, a control board 26 is sandwiched between the inner bracket 213 and the rear housing 211. The wireless charging module 22 is electrically connected to the control board 26. A charging interface 27 is provided on the control board 26. The charging interface 27 is exposed to the outer side of the rear housing 211. In addition, a non-slip pad 28 is provided on the back of the housing 21.

The use of this embodiment is described in detail as follows:

When in use, a data cable is connected between the charging interface 27 and an external power source, so that the main body 20 is connected to the power source for performing wireless charging. When a mobile phone (such as Apple iPhone 12, etc.) is attached to the placement seat 201, the built-in magnet of the mobile phone can be attracted and positioned by the first magnet 23. At this time, the wireless charging module 22 is accurately aligned with the receiver coil inside the mobile phone, and wireless charging can be performed after the pairing is successful.

The holder body 10 may be fixed to an external environment. When the main body 20 is pushed in different directions, the mobile phone placed on the main body 20 can be adjusted at different angles, so that the product has the functions of a charger and a holder.

The main body 20 can be separately removed from the holder body 10 and placed on a desktop as a common wireless charger for charging other types of mobile phones. In addition, the main body 20 may be directly sucked on the back of the mobile phone when playing games in Apple iPhone series, which is convenient to use.

Figure 7:
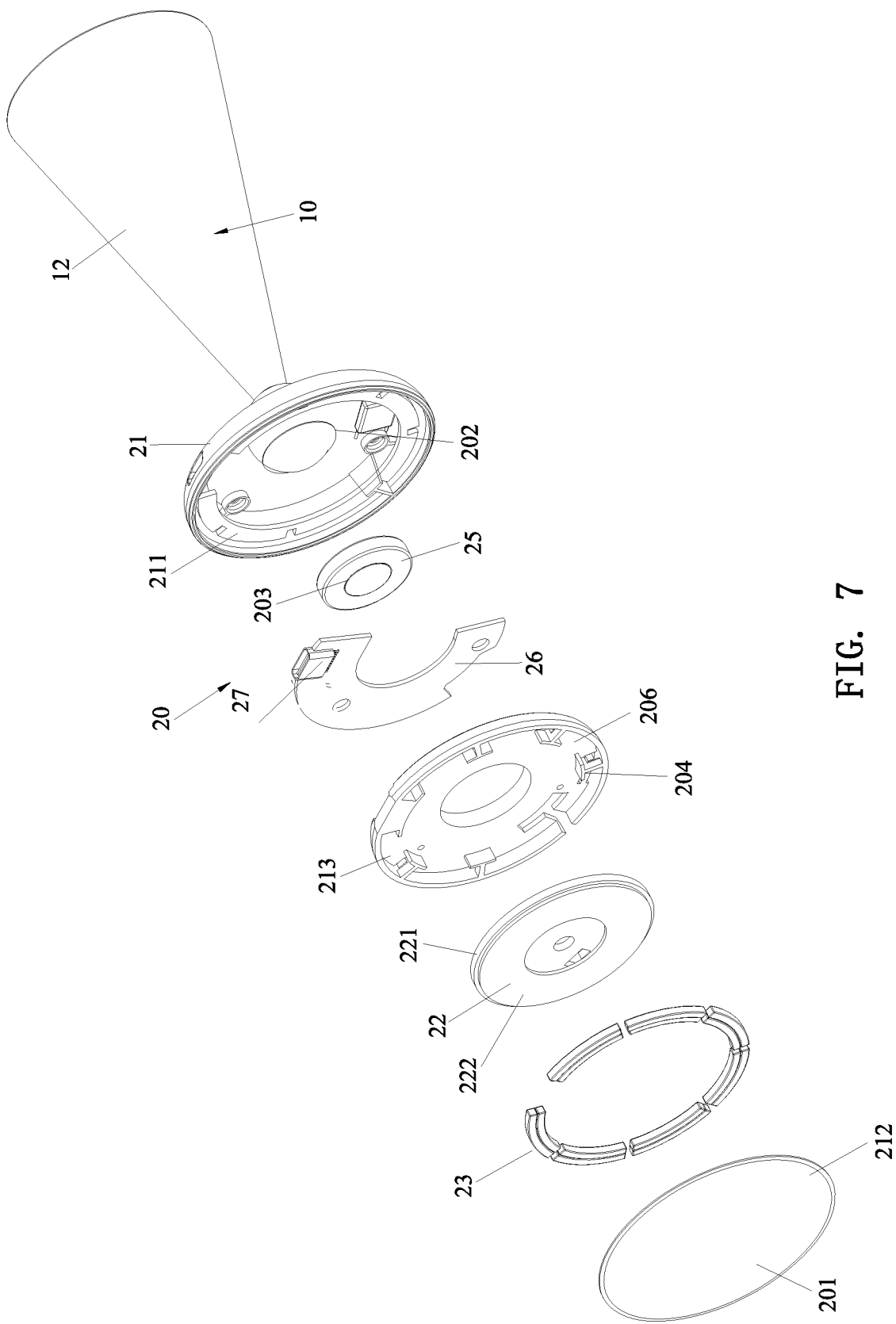
FIG. 7 is an exploded view according to a second embodiment of the present invention.
Figure 8:
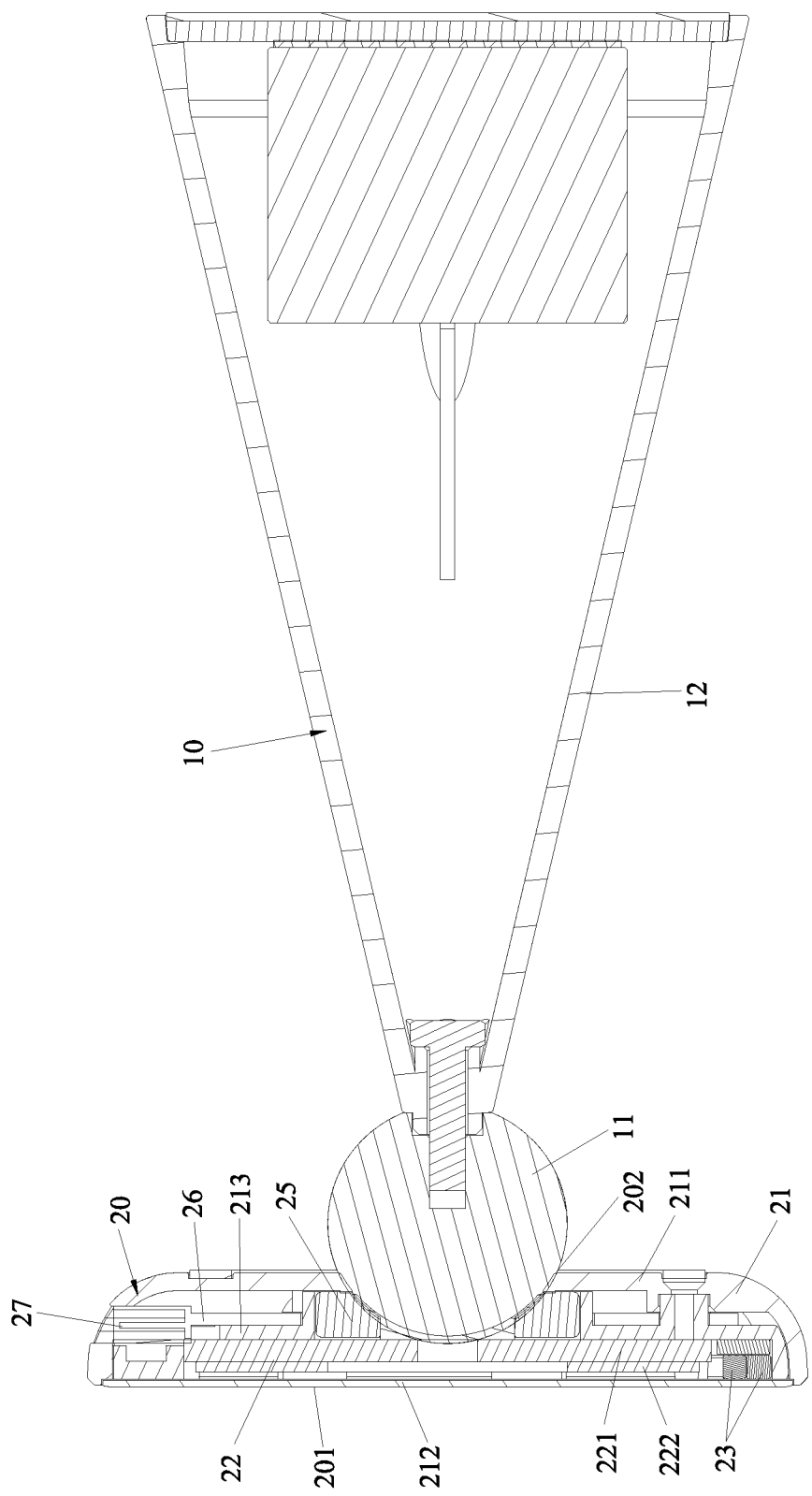
FIG. 8 is a cross-sectional view according to the second embodiment of the present invention.

FIG. 7 and FIG. 8 show the specific structure of a second embodiment of the present invention. The second embodiment is substantially similar to the first embodiment with the exceptions described hereinafter.

In this embodiment, the wireless charging module 22 includes a substrate 221 having a magnetic shield effect and a transmitter coil 222 arranged on the substrate 221. The second magnet 25 is located in back of the substrate 221. The second magnet 25 and the substrate 221 are mutually attracted each other. The substrate 221 is configured to block the magnetic force of the second magnet 25 to prevent the magnetic force from affecting the transmitter coil 222. This is beneficial to stabilize the wireless charging efficiency. There is no need to provide an additional magnetic shield, so as to simplify the internal structure of the product.

The use of the second embodiment is basically the same as the use of the first embodiment, so the use of the second embodiment will not be described in detail here.

What is claimed is:

1. A magnetic wireless charging holder, comprising a holder body and a main body; the main body being disposed on the holder body, the main body including a housing, a wireless charging module, and a first magnet configured to attract a built-in magnet of a mobile phone; a front of the housing having a placement seat, a magnetic shield being fixed in the housing, the wireless charging module and the first magnet being disposed in the housing and located in front of the magnetic shield, the wireless charging module being in proximity to the placement seat; the main body being detachably mounted on the holder body and positioned through magnetic attraction; a front end of the holder body having a spherical head, a back of the housing having a recess, the spherical head being rotatably embedded in the recess, a second magnet being provided in the recess for attracting and positioning the holder body, the second magnet being located in back of the magnetic shield, the second magnet and the magnetic shield being mutually attracted each other, the spherical head being attracted and positioned by the second magnet.

2. A magnetic wireless charging holder, comprising a holder body and a main body; the main body being disposed on the holder body, the main body including a housing, a wireless charging module, and a first magnet configured to attract a built-in magnet of a mobile phone; a front of the housing having a placement seat, the wireless charging module and the first magnet being disposed in the housing, the wireless charging module being proximity to the placement seat, the wireless charging module including a substrate having a magnetic shield effect and a transmitter coil arranged on the substrate; the main body being detachably mounted on the holder body and positioned through magnetic attraction; a front end of the holder body having a spherical head, a back of the housing having a recess, the spherical head being rotatably embedded in the recess, a second magnet being provided in the recess for attracting and positioning the holder body, the second magnet being located in back of the substrate, the second magnet and the substrate being mutually attracted each other, the spherical head being attracted and positioned by the second magnet.

3. The magnetic wireless charging holder as claimed in claim 1, wherein the second magnet is formed with a hole, the hole is aligned with the recess, and the spherical head is partially embedded in the hole.

4. The magnetic wireless charging holder as claimed in claim 1, wherein the holder body includes a body portion, a front end of the body portion has a threaded post, the spherical head is formed with a threaded hole, and the threaded post is threadedly connected to the threaded hole.

5. The magnetic wireless charging holder as claimed in claim 1, wherein the housing includes a rear housing, a front panel and an inner bracket, the front panel is disposed in front of the rear housing, the inner bracket is sandwiched between the rear housing and the front panel, the placement seat is located on the front panel, the wireless charging module and the first magnet are sandwiched between the inner bracket and the front panel, and the first magnet is located on a periphery of the wireless charging module.

6. The magnetic wireless charging holder as claimed in claim 5, wherein a plurality of T-shaped engaging blocks are provided on a periphery of a front side of the inner bracket, a plurality of T-shaped engaging grooves are formed on a periphery of the magnetic shield, and the plurality of T-shaped engaging blocks are engaged in the corresponding T-shaped engaging grooves, respectively.

7. The magnetic wireless charging holder as claimed in claim 5, wherein a plurality of arc-shaped grooves are formed on a periphery of a front side of the inner bracket, the first magnet is arc-shaped to be engaged in the corresponding arc-shaped grooves, the first magnet and the magnetic shield are mutually attracted to each other.

8. The magnetic wireless charging holder as claimed in claim 5, wherein a control board is sandwiched between the inner bracket and the rear housing, the wireless charging module is electrically connected to the control board, a charging interface is provided on the control board, and the charging interface is exposed to an outer side of the rear housing.

9. The magnetic wireless charging holder as claimed in claim 1, wherein the magnetic shield is made of iron.

* * * * *